July 20, 1965 W. A. ELSTON ETAL 3,195,362
UNIDIRECTIONAL STEP CLUTCH
Filed Oct. 5, 1960

INVENTORS
William A. Elston
William C. Tomerlin, Jr.

BY *Adolph C. Hugin*
ATTORNEY 3,195,362
UNIDIRECTIONAL STEP CLUTCH
William A. Elston and William C. Tomerlin, Jr., Shreveport, La., assignors to United Gas Corporation, a corporation of Delaware
Filed Oct. 5, 1960, Ser. No. 60,639
5 Claims. (Cl. 74—142)

This invention relates to improved unidirectional step clutches. It is particularly directed to a construction wherein a unidirectional drive is provided which assures a predetermined angular advance of the driven member of the clutch for each step before a succeeding advance can be begun.

For certain types of drives, such as are used in connection with reels for winding tapes and films, it is essential that the drive of the driven member be limited to one direction and that a reverse rotation of the driving member will have no effect on the rotation of the driven member. In many instances, it is also desirable that the advance of the tape or film reel be limited to a predetermined amount.

According to the present invention, a desired unidirectional step drive is obtained by providing a clutch with drive and driven members wherein the drive member utilizes a resiliently biased pawl element for drivingly engaging a driven means on the driven member for one direction of rotation and has a non-driving slip engagement therewith for the opposite direction of rotation. The rotational advance of the drive member is delimited by stops suitably arranged to define the angular advance of the driven member to any angle up to 360°, slightly greater than the desired predetermined angular step advance of the clutch, and the driven means on the driven member engageable by the drive member pawl are angularly spaced exactly the predetermined angular advance desired for each step.

This construction assures a positive advance of the driven member for each step which will comprise the full predetermined angular advance desired, as the driving pawl of the driving member cannot engage a succeeding driven means on the driven member until the preceding driven means has advanced through the desired angle. Furthermore, by making the angle between the stops which delimit the rotational movement of the driving member such that the angle of movement of the drive member is slightly greater than the desired angle of advance, the full advance of each step is assured. The fact that the driving member may be rotated through an angle slightly greater than the desired angular advance will in no way affect the actual angular advance of each step, for reverse rotation of the driving member after each full advance through such a larger angle will only result in a slight amount of lost motion of the driving member at the end of each return, prior to a subsequent engagement with the succeeding driven means on the driven member of the clutch. Thus, in each instance, the full desired angular advance will be assured for each step before a succeeding advance step can be started and the exact angular advance will be accurately provided.

An object of the present invention is to provide an improved unidirectional clutch.

Another object of this invention is to provide an improved unidirectional step clutch.

A further object of the present invention is to provide an improved unidirectional step clutch having means assuring against reverse rotation of the driven member between advances thereof.

Further objects and advantages of this invention will become apparent from the following description referring to the accompanying drawing, and the features of novelty which characterize this invention will be pointed out with particularity in the claims appended to and forming a part of this specification.

Figure 1:
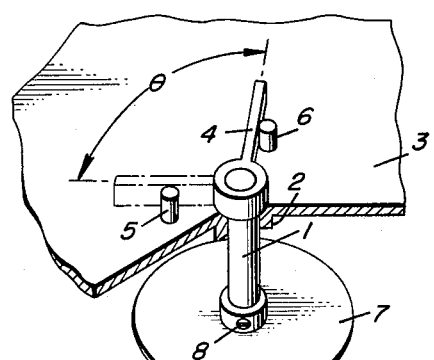
FIG. 1 is a partially exploded perspective view of the principal components of a unidirectional step clutch embodying the present invention with a fragmentary illustration of associated mounting and driven elements.
Figure 3:
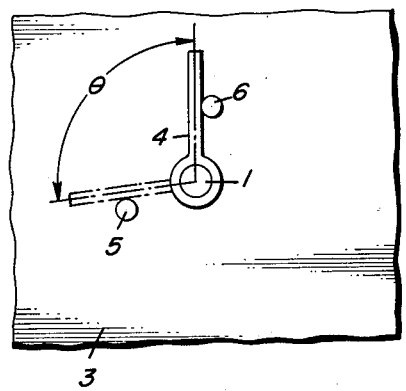
FIG. 3 is a plan view of the clutch shown in FIGS. 1 and 2, as viewed in the direction indicated by the line 3—3 in FIG. 2.
Figure 4:
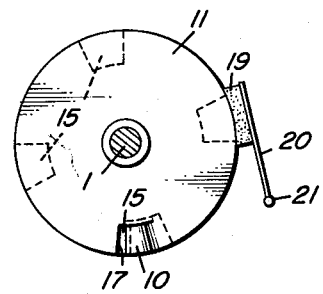
FIG. 4 is a sectional view, taken along line 4—4 of FIG. 2, illustrating particularly the drive member of the clutch.

Referring to the drawing, an improved unidirectional step clutch for providing a predetermined angular advance step-drive is illustrated which comprises a drive shaft 1 rotatably mounted in a suitable mounting, such as a bearing boss 2 on a housing panel 3, and drivingly connected to an actuating member 4, which may conveniently take the form of a suitable handle or knob. The actuating member 4 is secured to the drive shaft 1 on one side of the housing 3 and extends between a pair of stops 5 and 6 spaced angularly apart with reference to the axis of the drive shaft at an angle slightly greater than the predetermined angular advance desired, sufficient to provide for the rotational movement of the actuating member through an angle θ slightly greater than the desired angular advance φ of each respective step. This assures that the drive shaft 1 will be turned through an angle θ slightly greater than the desired angular advance φ for each full operation of the actuating member between the delimiting stops 5 and 6.

Figure 2:
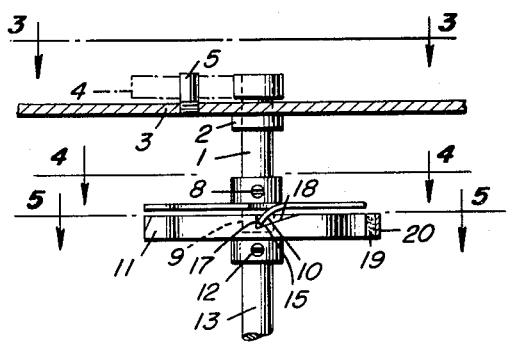
FIG. 2 is an elevational view of the clutch shown in FIG. 1, in assembled relationship.
Figure 5:
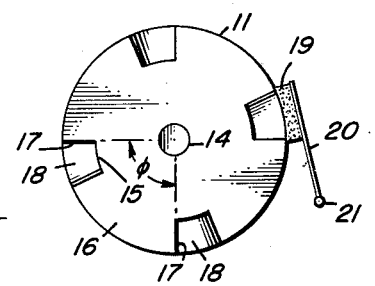
FIG. 5 is a sectional view, taken along line 5—5 of FIG. 2, with parts of the driving member removed in order more clearly to illustrate details of the driven member of the clutch.

The driving member of the clutch includes a drive plate 7 secured in any suitable manner, as by a set screw 8, to the drive shaft 1 and preferably mounted on the shaft so as to allow for a predetermined projection 9 of the end of the shaft beyond the side of the drive plate 7 away from the actuating member 4. The drive plate 7 preferably is formed of resilient material, such as a spring steel or beryllium bronze, and is provided with a pawl drive element which is resiliently biased away from the actuating member 4 toward a driven clutch member for driving engagement therewith. As shown in FIGS. 1 and 2, this pawl drive element may very simply be formed as a tab 10 punched from the drive plate 7 and extending angularly therefrom. In such a construction, the resiliency of the plate material provides the desired biasing force for the pawl and thus further simplifies the structure and minimizes the number of operating parts.

The drive through the clutch is provided from the drive shaft 1 through the pawl tab 10 to a driven clutch plate 11 of the driven cluch member. This driven clutch plate is drivingly mounted in any suitable manner, as by a set screw 12, on a driven shaft 13, and preferably is formed with a socket 14 which is adapted rotatably to receive and support the end 9 of the drive shaft 1. For simplicity of construction, the driven clutch plate 11 may be formed with an axially extending passage therethrough and mounted on the driven shaft 13 in a position so as to provide a space extending from the face thereof adjacent to the drive plate 7 which forms a socket for rotatably receiving the end 9 of the drive shaft 1. Any other suitable relatively rotatable mountings for the adjacent ends of the drive shaft 1 and the driven shaft 13 can be provided, including a reversal of the illustrated male and female connection therebetween.

The drive between the drive plate 7 and the driven plate 11 is provided by the engagement of the pawl tab 10 with driven means on the driven plate 11 which are spaced apart exactly the desired predetermined angle of advance of each step. This angle of advance can be chosen to suit the requirements of the drive, and the spacing of the driven means on the driven plate 11 will accordingly depend upon the requirements of the drive in which the clutch is to be utilized.

In the illustrated arrangement, the driven means on the driven plate 11 comprise a plurality of recesses 15 formed in the face 16 of the driven plate 11 adjacent to the drive plate 7. Each of these recesses is formed with a drive edge 17 extending substantially perpendicularly to the face 16 of the driven plate 11, with a tapered lead-out surface 18 extending circumferentially from the inner end of the drive edge 17 to the face 16 in a direction opposite to the direction of drive.

As is more clearly shown in FIG. 2, a positive mechanical driving connection is provided between the drive plate 7 and the driven plate 11 through the pawl tab 10 by engagement of the end of the pawl tab 10 with the drive edge 17 of one of the recesses 15. Rotation of the actuating member 4 from the stop 5 to the stop 6 turns the drive shaft 1, and consequently the pawl tab 10, through an angle $\theta$. This provides a mechanical drive of the driven shaft 13 by the direct mechanical connection afforded by the engagement of the pawl tab 10 on the drive plate 7 with the drive edge 17 of a recess 15 in the driven plate 11.

Before any further drive can be provided through the clutch, the actuating member 4 must be rotated in a reverse direction from a position in engagement with stop 6 to a position substantially in engagement with stop 5. Such reverse rotation of the actuating member 4 causes the resilient pawl tab 10 to slip upwardly out of the recess 15 over the tapered surface 18 and the adjacent surface of the driven plate face 16 until it extends over another recess 15 into which it is inherently resiliently biased. Since the angle $\theta$ is slightly greater than the desired angle of advance $\phi$ between adjacent drive edges 17 of adjacent recesses 15, a full return of the actuating member 4 from a position in engagement with stop 6 to a position in engagement with stop 5 will cause the pawl tab 10 to extend a slight distance away from the drive edge 17 of the slot 15 in the position $a$, FIG. 1. As the actuating member 4 is rotated in a driving direction from stop 5 toward stop 6, a slight amount of lost motion will occur until the end of the pawl tab 10 engages the drive edge 17 of the recess 15 in position $a$. This assures that the driven plate 11 will be advanced a step exactly equal to the angular spacing $\phi$ between adjacent drive edges 17 of the adjacent recesses 15 for each complete operation of the actuating member 4.

In many instances, it will be found that the friction in the parts connected to the driven shaft 13 will be sufficient to prevent reverse rotation of the driven shaft 13 and the driven clutch plate 11 during reverse rotation of the actuating member 4 from engagement with the stop 6 to engagement with the stop 5. In some instances, however, it may be found desirable to assure against possible reverse rotation of the driven shaft 13 during such reverse rotation of the actuating member 4 by a suitable brake, which permits an advance drive of the driven shaft without appreciable resistance and yet affords sufficient braking to prevent reverse rotation. In the illustrated embodiment, this is afforded by a simple friction pad or shoe 19, which may conveniently engage the circumferential surface of the driven plate 11. The friction brake shoe 19 is resiliently biased continuously into engagement with the surface of the driven plate 11 by being mounted on a suitable leaf spring 20 which is secured in any suitable manner, as by a mounting post 21, on the housing 3 or a relatively stationary associated part. In this manner, a very simple unidirectional drive structure is provided through a step clutch which assures a predetermined angular advance of a driven member for each step prior to actuation for a succeeding step and also assures against reverse rotation of the driven member between advance actuations thereof.

While a particular embodiment of this invention has been illustrated and described, modifications thereof will occur to those skilled in the art. It is to be understood, therefore, that this invention is not to be limited to the particular details disclosed, and it is intended in the appended claims to cover all modifications within the spirit and scope of this invention.

What is claimed is:

1. A unidirectional step clutch for providing a predetermined angular advance step-drive comprising an actuating member, a pair of stops spaced angularly apart for delimiting the rotational movement of said actuating member to an angle slightly greater than the predetermined desired angular advance of said clutch drive, a clutch driven member having a face with recesses therein each formed with a drive edge spaced angularly apart the predetermined desired angle of advance of each respective step, means including a clutch drive member having a pawl drive element resiliently biased toward said driven member into engagement therewith for driving said driven member in one direction by engagement of a recess drive edge and for disengaging the drive therebetween on rotation of said drive member in the opposite direction by said actuating member, means for drivingly connecting said actuating member to said clutch drive member, and means including a brake element resiliently biased into continuous engagement with said driven member for preventing reverse rotation thereof.

2. A unidirectional step clutch for providing a predetermined angular advance step-drive comprising a drive shaft, and actuating member drivingly connected to said drive shaft, a pair of stops spaced angularly apart for delimiting the rotational movement of said actuating member to an angle slightly greater than the predetermined desired angular advance of said clutch drive, a clutch driven member having a face with recesses therein spaced angularly apart with reference to the axis of said drive shaft the predetermined desired angle of advance of each respective step, means including a clutch drive member drivingly connected to said drive shaft and having a pawl drive element resiliently biased into engagement with said driven member for driving said driven member in one direction by engagement in a recess thereof and for disengaging the drive therebetween on rotation of said drive member in the opposite direction by said actuating member, means for continuously preventing reverse rotation of said driven member.

3. A unidirectional step clutch for providing a predetermined angular advance step-drive comprising a drive shaft, an actuating member drivingly connected to said drive shaft, a pair of stops spaced angularly apart for delimiting the rotatonal movement of said actuating member to an angle slightly greater than the predetermined desired angular advance of said clutch drive, a clutch drive member drivingly connected to said drive shaft and having a pawl drive element resiliently biased in a direction away from said actuating member, a clutch driven member having a face adjacent to said drive member formed with a plurality of driven means engageable by said pawl drive element and spaced angularly apart with reference to the axis of said drive shaft the predetermined desired angle of advance of each respective step, and means including a brake element resiliently biased into continuous engagement with said driven member for holding said driven member when not driven by said drive member.

4. A unidirectional step clutch for providing a predetermined angular advance step-drive comprising a drive shaft, an actuating member drivingly connected to said drive shaft, a pair of stops spaced angularly apart for delimiting the rotational movement of said actuating member to an angle slightly greater than the predetermined desired angular advance of said clutch drive, a clutch drive plate drivingly connected to said drive shaft and having a resilient pawl drive element in the form of a tab extending angularly from said drive plate in a direction away from said actuating member, a clutch driven plate having a face adjacent to said drive plate and having recesses in said face each formed with a drive edge engageable by said pawl drive element and spaced angularly apart with reference to the axis of said drive shaft the predetermined desired angle of advance of each respective step, said recesses each being formed with a tapered lead-out surface extending circumferentially from said drive edge opposite to the direction of drive, and means including a brake element resiliently biased into engagement with said driven plate for preventing reverse rotation of said driven plate.

5. A unidirectional step clutch for providing a predetermined angular advance step-drive comprising a drive shaft, an actuating member drivingly connected to said drive shaft, a pair of stops spaced angularly apart for delimiting the rotational movement of said actuating member to an angle slightly greater than the predetermined desired angular advance of said clutch drive, a clutch driven plate having a face with recesses therein each formed with a drive edge spaced angularly apart with reference to the axis of said drive shaft the predetermined desired angle of advance of each respective step, said recesses each being formed with a tapered lead-out surface extending circumferentially from said drive edge opposite to the direction of drive, means including a clutch drive plate drivingly connected to said drive shaft and having a resilient pawl drive element in the form of a tab extending angularly from said drive plate in a direction away from said actuating member into engagement with said driven plate face for driving said driven plate in one direction by engagement of said recess driven edge thereof and for disengaging the drive therebetween on rotation of said drive plate in the opposite direction by said actuating member, and means including a brake element resiliently biased into engagement with said driven plate for preventing reverse rotation thereof.

References Cited by the Examiner
UNITED STATES PATENTS

| | | | |
|---|---|---|---|
| 401,512 | 4/89 | Oehlmann | 188—83 |
| 443,781 | 12/90 | Sheldon | 74—575 |
| 504,274 | 8/93 | Lang | 74—126 |
| 551,782 | 12/95 | Muller. | |
| 654,802 | 7/00 | McCain. | |
| 791,124 | 5/05 | Baehr | 74—526 |
| 1,144,876 | 6/15 | Taigman | 192—12 |
| 1,618,750 | 2/27 | Camp | 74—156 |
| 1,974,054 | 9/34 | Popp | 74—156 |
| 2,153,084 | 4/39 | Harada | 74—142 |
| 2,251,974 | 8/41 | Berck | 74—575 |
| 2,365,839 | 12/44 | Pike | 74—142 |
| 2,563,302 | 8/51 | Atkinson et al. | 74—142 |
| 2,733,529 | 2/56 | Ruger | 42—67 |
| 2,806,316 | 9/57 | Ruger | 42—67 |
| 2,857,783 | 10/58 | Ranck et al. | 74—526 |
| 2,943,512 | 7/60 | Nicolaus | 74—575 |

BROUGHTON G. DURHAM, *Primary Examiner.*

DON A. WAITE, *Examiner.*